United States Patent Office 3,696,077
Patented Oct. 3, 1972

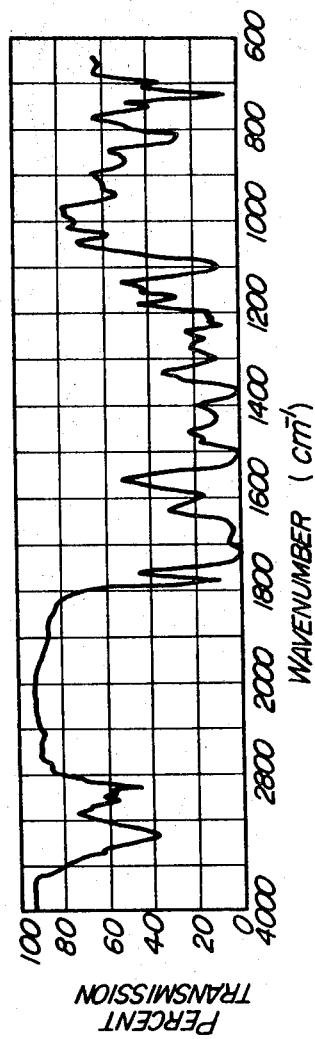

3,696,077
AROMATIC POLYAMIDE-IMIDES SOLUBLE IN PHENOLIC SOLVENTS AND PROCESS FOR PRODUCING SAME
Munehiko Suzuki, Yokosuka, Etsuo Hosokawa, Yokohama, Misao Waki, Kawasaki, and Masatada Fukushima, Yokohama, Japan, assignors to Showa Electric Wire & Cable Co., Ltd., Kawasaki-shi, Japan
Filed June 11, 1970, Ser. No. 45,346
Claims priority, application Japan, June 13, 1969, 44/47,125
Int. Cl. C08g 20/32
U.S. Cl. 260—78 TF    15 Claims

ABSTRACT OF THE DISCLOSURE

A novel aromatic polyamide-imide consists essentially of the recurring unit represented by the formula:

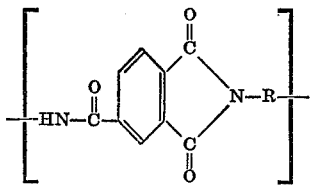

wherein R is a divalent radical having benzene unsaturation, the two linkages of which are attached to different carbon atoms of the benzene ring, at least 30 mole percent of R being at least one member selected from the group consisting of divalent radicals represented by the formulas:

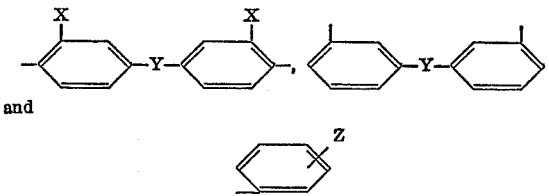

and

wherein X is at least one member selected from the group consisting of lower alkyl groups, lower alkoxy groups, halogen atoms, —COOH, —OH and —SO$_3$H; Y is at least one member selected from the group consisting of —CH$_2$—, —O—, —S—, —SO$_2$— and $$-\underset{\underset{CH_3}{|}}{\overset{\overset{CH_3}{|}}{C}}-$$

and Z is a lower alkyl group, said polyamide-imide having an inherent viscosity of at least 0.1 as measured in m-cresol at 30° C. at a concentration of 0.5 g./100 ml. Said aromatic polyamide-imide can directly be dissolved in a phenolic solvent, and the resulting solution may be used as a varnish for the formation of a heat-resistant film in various fields, such as magnet wire.

---

This invention relates to a novel aromatic polyamide-imide. More particularly, it relates to an aromatic polyamide-imide which is soluble in phenolic solvents and to a process for producing the same.

There has heretofore been known a process for producing an aromatic polyamide-imide, which comprises reacting a monoacid halide of trimellitic anhydride with an aromatic diamine in substantially equimolar amounts in an organic polar solvent, such as N-methyl-2-pyrrolidone, N,N-dimethylacetamide or the like, at a temperature of less than 70° C., preferably 25° to 50° C. to form an aromatic polyamide-acid, forming the armatic polyamide-acid into a film and then heating the film to effect dehydration-cyclization (refer to Japanese patent publication No. 15,637/67 and U.S. patent application Ser. No. 252,557). Further, in said reaction, a hydrogen halide is produced as a by-product, and hence, there is known a process in which an acid acceptor, such as triethylamine, pyridine or the like, is added to said reaction system to remove the hydrogen halide (refer to Japanese patent publication No. 30,260/68).

According to such known processes for producing aromatic polyamide-imides, only a monoacid halide of trimellitic anhydride can be used as the acid component, and in addition, an expensive aromatic polar solvent must be used as the reaction medium. Therefore, the resulting resin becomes very expensive. Moreover, the organic polar solvents are harmful to the human body, and hence, a special care must be paid in handling the solvents.

Since the above reaction is effected at a low temperature, the hydrogen halide produced as by-product is difficult to take off, and therefore, a means for removing the hydrogen halide after reaction is required.

The aromatic polyamide-imide synthesized by such a known method is insoluble in organic solvents, and therefore, the formation of a film is required to be effected in the form of a polyamide-acid prior to the conversion into a polyamide-imide. However, when the above polyamide-acid solution is used as a varnish, foaming due to the water formed is caused during heating, and hence, it is impossible to apply the solution in a large amount at once.

An object of the present invention is to provide an aromatic polyamide-imide soluble in phenolic solvents.

Another object of the present invention is to provide a process for producing an aromatic polyamide-imide in which not only a monoacid halide of trimellitic anhydride but also trimellitic acid per se, trimellitic anhydride and lower alkyl esters thereof may be used as the acid component and the reaction does not require any special dehydrohalogenation treatment.

Other objects and advantages of the present invention will be apparent from the following description.

The accompanying drawings are the infra-red spectrum analysis chart of the polyamide-imide obtained in Example 1 which will be described hereinafter.

According to the present invention, the novel aromatic polyamide-imide consists essentially of the recurring unit represented by the formula:

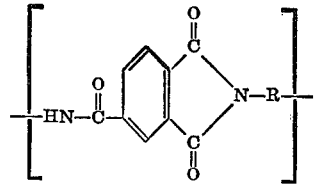

wherein R is a divalent, radical having benzene unsaturation, the two linkages of which are attached to different carbon atoms of the benzene ring, at least 30 mole percent of R being at least one member selected from the group consisting of divalent radicals represented by the formulas:

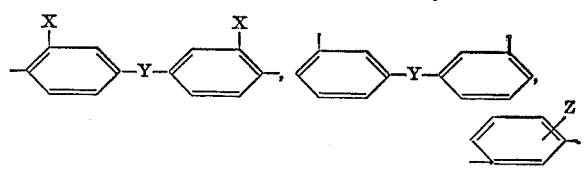

wherein X is at least one member selected from the group consisting of lower alkyl groups, such as methyl, ethyl, n-propyl, iso-propyl and the like; lower alkoxy groups, such as methoxy, ethoxy, n-propoxy, iso-propoxy and the like; halogen atoms, such as chlorine, bromine, iodine or the like; —COOH; —OH and —SO$_3$H, and Y is at least one member selected from the group consisting of —CH₂—, —O—, —S—, —SO₂— and

said polyamide-imide having an inherent viscosity of at least 0.1 (30° C., 0.5 g./100 ml., m-cresol).

Preferable divalent radicals other than the above-mentioned radicals for R are as follows:

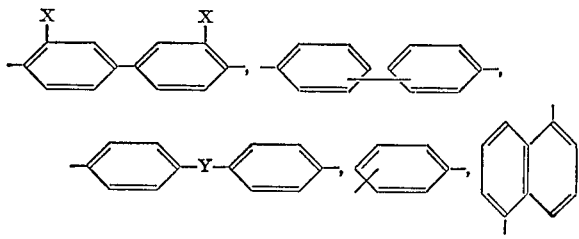

and the like.

The phenolic solvents used in the present invention include not only phenol but also cresols, such as o-, m-, p-cresols; xylenols such as 2,3-xylenol, 2,4-xylonol, 2,5-xylenol, 2,6-xylenol, 3,4-xylenol, 3,5-xylenol, etc. and halogen derivatives thereof, such as mono-, di-, tri- and tetra-halocresols, mono-, di-, tri-haloxylenols and the like, in which the halogen may be Cl, Br or I. Of the halogen derivatives, preferable are those which are liquid at room temperature. Even normally solid halogen derivatives may be used in the form of a solution in a small amount of an aromatic hydrocarbon, such as toluene or xylene. However, since the reaction medium is generally vaporized off from the product, and halogenated phenols are more expensive than non-halogenated phenols, it is preferable to use non-halogenated phenols, such as phenol, cresol, xylenol, etc. Moreover, the phenolic solvents may be used in the form of a mixture with less than 30%, preferably 20 to 30% by weight of a poor solvent, such as solvent naphtha, toluene, xylene and the like. Particularly, when the phenolic solvent is a halogenated phenol, it is desirable to use the same in the form of said mixture because the halogenated phenol has a high melting point. Such a mixture may be used as the reaction medium and as the diluent after reaction.

The aromatic polyamide-imide of the present invention can be prepared in the form of a transparent solution by heating trimellitic acid with at least one aromatic diamine in substantially equimolar amounts, said diamine having the formula, H₂N—R—NH₂ in which R is the same as defined above, at least 30 mole percent thereof being represented by the formulas:

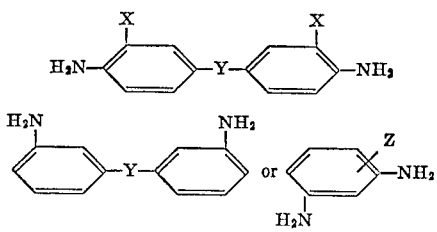

in a phenolic solvent at a temperature higher than 80° C. preferably higher than 100° C., but lower than the boiling point of the solvent, i.e., about 100° to 240° C., for a period of time sufficient for allowing imide-cyclization to be completed. If the reaction is effected under reduced pressure, lower temperatures may be used. Further, the reaction may be accelerated by use of a catalyst selected from metal naphthenates, such as lead naphthenate; tetrabutyl titanate; picoline; quinoline and tertiary amines, such as trimethylamine.

The reaction proceeds with a two step dehydration-condensation, which is, for example, as follows:

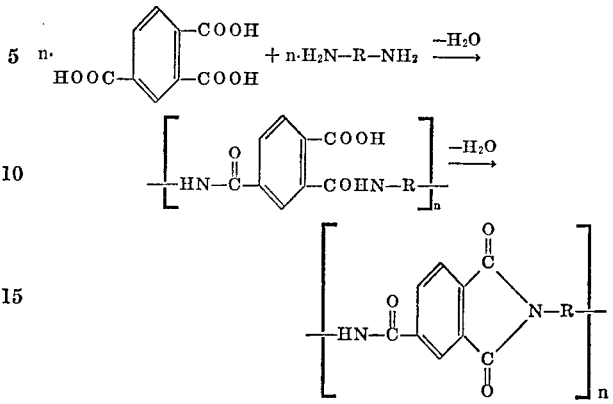

As mentioned above, the reaction in the present process is effected at elevated temperatures, and hence, not only monoacid halides of trimellitic anhydride but also trimellitic acid per se, anhydrides thereof and lower alkyl esters thereof, such as methyl ester, ethyl ester, propyl ester, etc. may be used as the trimellitic acid component. Even when a monoacid halide of trimellitic anhydride is used, no step for removing hydrogen halide is required since the hydrogen halide produced as by-product is removed out of the system by heating.

Since the synthesis of the present aromatic polyamide-imide is based on the reaction by heating as mentioned above, the control of reaction temperature is easy, and the reaction proceeds rapidly. The reaction is usually completed in about one hour at 160° C. The formation of polyamide-imide can be confirmed by the fact that the infra-red spectrum analysis chart of the reaction product shows remarkable absorption in the neighbourhood of 1780 cm.⁻¹, 1730 cm.⁻¹ and 730 cm.⁻¹, which is the characteristic absorption of imide, and the disappearance of absorption in the neighbourhood of 1700 cm.⁻¹, which is the characteristic absorption of free carboxyl group. None of these phenomena are observed in the chart of polyamide-acid.

The greatest feature of the present aromatic polyamide-imide is that the polyamide-imide per se is dissolved in an inexpensive, non-toxic phenolic solvent.

Known aromatic polyamide-imides can not be dissolved in any solvent, though polyamide-acids can be dissolved only in expensive, toxic, organic polar solvents, and hence, when they are used as a varnish, water results from dehydration-cyclization during heating, whereby foam is caused in the resulting film, and a special care is required in handling. However, no such problems are caused with the present aromatic polyamide-imide. Therefore, a varnish of the present aromatic polyamide-imide can be applied in a large amount at once, whereby the number of applications can be reduced.

A varnish, generally, contains a solvent in an amount of more than a half of the weight of the varnish and the solvent is finally vaporized off. Therefore, the cost of varnish can be reduced by use of the present aromatic polyamide-imide dissolved in an inexpensive phenolic solvent.

The proposition of the radicals for R in the present aromatic polyamide-imide can be controlled by varying the proportion of the starting aromatic diamines, and the properties of the resulting aromatic polyamide-imide vary depending upon the kind and proportion of the radicals for R. When R is a radical having the formula,

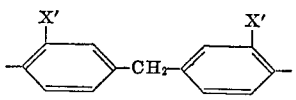

in which X' is a lower alkyl group, such as methyl, ethyl, n-propyl, iso-propyl, etc., the best flexibility is obtained. When a radical represented by the formula,

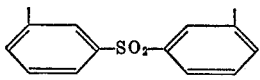

is contained as R in the polymer, the solubility thereof is enhanced. Further, aromatic polyamide-imides having various characteristics can be obtained by introducing radicals other than

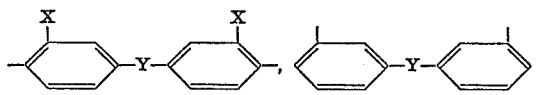

and

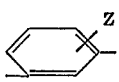

for R into the polymer chain. However, when the proportion of radicals for R other than

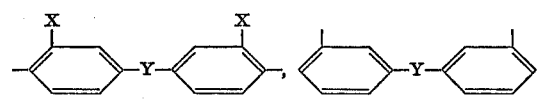

and

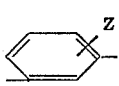

is more than 70% by mole, the resulting polyamide-imide is insoluble in phenolic solvents. In order to introduce said other radicals in the desired amount, it is sufficient to use the starting diamines corresponding to these radicals in the desired amounts, such as

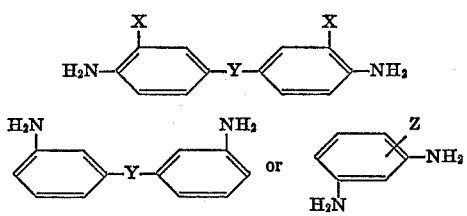

in combination with

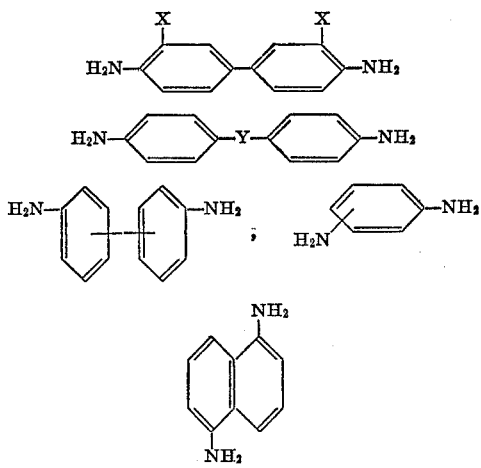

and the like.

The molar ratio of the trimellitic acid component to the diamine is preferably 1:1, though it may be 0.9 to 1.1:1, in which range a sufficiently high molecular weight polyamide-imide can be obtained. When the acid component is used in excess of the diamine component, the terminal groups of the resulting polyamide-imide are benzene rings having one carboxyl group or two carboxyl groups, and when the diamine is used in excess of the acid component, the terminal groups of the polyamide-imide are amino groups. When the two components are used in substantially equimolar amounts, the terminal groups of the resulting polyamide-imide are in substantially equimolar admixture of these terminal groups. When the acid component is a monoacid halide of trimellitic anhydride, the OH of the terminal carboxyl groups is substituted by the halogen, and when it is a lower alkyl ester of trimellitic acid, the H of the terminal carboxyl group is substituted by the alkyl group. When the acid component is trimellitic anhydride, the terminal carboxyl groups form an anhydride group.

The present aromatic polyamide-imide is soluble in phenolic solvents and has an inherent viscosity of at least 0.1. The aromatic polyamide-imide in the form of a solution as produced or after a modifier is added thereto, if necessary, can be used as a varnish. Further, the aromatic polyamide-imide can be isolated by adding a large amount of a poor solvent to the solution, and the thus isolated polyamide-imide can be stored. As the modifier, soluble polyesters and diisocyanates may be used.

The isolated polyamide-imide can be dissolved in a solvent, if necessary, to form a solution, which can be used as a varnish. Further, the isolated polyamide-imide itself can be used as a stabilizer for rubbers, plastics, etc. or as a compression-molding resin.

The present invention will be further explained in more detail by referring to the following examples, which are only by way of illustration and not by way of limitation.

In the examples, all the inherent viscosities were calculated according to the following equation:

$$\text{Inherent viscosity} = \frac{\log_e \frac{\text{Viscosity of solution}}{\text{Viscosity of solvent}}}{C}$$

wherein C is the concentration of a polymer in grams per 100 ml. of solvent. The viscosity of solution is the viscosity of a solution of 0.5 g. of polymer in 100 ml. of cresol measured at 30° C. Moreover, the infra-red spectrum analysis was according to a film method.

EXAMPLE 1

Into a three-necked flask provided with a thermometer, a stirrer and a condenser were charged 21.0 g. (0.1 mole) of trimellitic anhydride monoacid chloride, 22.8 g. (0.1 mole) of 3,3'-dimethyl-4,4'-diaminodiphenylmethane and 150 g. of m-cresol at the same time, and the temperature of the resulting mixture was elevated with stirring from room temperature to 160° C. When the temperature reached 160° C., water and hydrogen chloride began to be gradually evaporated off from the reaction system, and the system was gradually made transparent. The reaction was continued for about one hour and stopped after the effusion of water vapor from the reaction system was over. When the reaction product was cooled to room temperature, the viscosity of the product was somewhat increased, but the product was transparent and fluid. The resulting resin had an inherent viscosity (m-cresol, 0.5 g./100 ml. concentration, 30° C.; same being applied hereinafter of 0.68. The resulting resin solution was applied to a cleaned, tin-plated iron plate, dried at 50° C. under reduced pressure for 24 hrs., and then the assembly was immersed in mercury to peel the resulting film from the plate. Said film was pale yellow and had toughness and flexibility and did not melt even at 300° C. The infra-red spectrum of the film was as shown in the attached drawings, in which imide-characteristic absorption appeared remarkably in the neighborhood of 1780, 1730 and 730 cm.$^{-1}$, and the characteristic absorption of free carboxyl group disappeared in the neighborhood of 1700 cm.$^{-1}$. It was confirmed from this fact that imidation was substantially completed.

EXAMPLE 2

By use of the same apparatus as in Example 1, a mixture of 19.1 g. (0.1 mole) of trimellitic anhydride, 26.9 g. (0.1 mole) of 3,3' - dichloro - 4,4' - diaminodiphenylmethane and 150 g. of technical grade xylenol (m-cresol and p-cresol: 27.9%; 2,4-xylenol and 2,5-xylenol: 33.1%; p-ethylphenol and 3,4-xylenol; 31.0% and others: 7.3%) (the same being applied hereinafter) was formed by charging these at the same time into the apparatus, and the temperature of the mixture was elevated with stirring from room temperature to 170° C. At this temperature, water began to be gradually evaporated off from the reaction system, and the solution came to be transparent. The reaction was continued for about one hour and stopped after the effusion of water vapor from the system was over. When the reaction product was cooled, the product had a somewhat increased viscosity, but was transparent and fluid.

From the thus obtained resin solution, a film was prepared in the same manner as in Example 1, and subjected to infra-red spectrum analysis to find clearly the characteristic absorption of imide and the complete disappearance of the characteristic absorption of free carboxyl group.

Acetone was then gradually added to said resin solution to precipitate a yellow polyamide-imide which was then filtered off and dried under vacuum to obtain a solid resin in the form of a powder. The amount of the resin obtained was 40.7 g. (yield: 96% by weight), and the inherent viscosity of the resin was 0.71.

The ultimate analysis of the resin as $C_{22}H_{12}O_3N_2Cl_2$ was as follows:

Calcd. (percent): C, 62.4; H, 2.8, and N, 6.6. Found (percent): C, 62.0; H, 3.0, and N, 6.4.

0.1 mole of 4,4'-diaminodiphenyl ether was substituted for the 3,3'-dichloro-4,4'-diaminodiphenylmethane, precipitates were formed with the progress of reaction, whereby the reaction system was gelled.

EXAMPLES 3 TO 10

In the same manner as in Example 1, pale yellow polyamide-imides were obtained from the starting materials shown in Table 1 by use of the solvents shown in the same table. The characteristics of the polyamide-imides were as shown in Table 1. The polyamide-imides obtained were subjected to infra-red spectrum analysis in the same manner as in Example 1 to find that all the charts thereof indicate remarkable absorptions in the neighbourhood of 1780 cm.$^{-1}$, 1730 cm.$^{-1}$ and 730 cm.$^{-1}$, and absorption in the neighbourhood of 1700 cm.$^{-1}$ which is the characteristic absorption of free carboxyl group, disappeared. Snce in Example 7, the aromatic diamine used had carboxyl groups in the side chain, the infra-red spectrum chart of the product indicated that absorption due to the carboxyl groups in the side chain appeared in the neighbourhood of 1700 cm.$^{-1}$. That this absorption was not due to polyamide-acid was confirmed by the following method: A polyamide-acid was synthesized from the same starting materials as in Example 7 at a temperature of 0° to 10° C. and subjected to infra-red spectrum analysis to find that substantially no characteristic absorption of imide appeared in the neighbourhood of 1780 cm.$^{-1}$, 1730 cm.$^{-1}$ and 730 cm.$^{-1}$ and the characteristic absorption due to free carboxyl group in the neighbourhood of 1700 cm.$^{-1}$ was much stronger than that in Example 7, whereby it was confirmed that the product of Example 7 was substantially completely imidated.

TABLE 1

| Example | 3 | 4 | 5 | 6 | 7 | 8 | 9 | 10 |
|---|---|---|---|---|---|---|---|---|
| Trimellitic acid (mole) | 0.1 | | 0.1 | | | | | |
| Trimellitic anhydride (mole) | | | | | 0.17 | | 0.1 | 0.1 | 0.1 |
| Trimellitic anhydride monoacid chloride (mole) | | 0.1 | | | | 0.1 | | |
| 3,3'-dihydroxy-4,4'-diaminodiphenylmethane (mole) | 0.1 | | | | | | | |
| 3,3'-dicarboxy-4,4'-diaminodiphenylmethane (mole) | | | | | | 0.1 | | |
| 3,3'-diethoxy-4,4'-diaminodiphenyl sulfide (mole) | | | 0.1 | | | | | |
| 3,3'-disulfo-4,4'-diaminodiphenylmethane (mole) | | | | 0.1 | | | | |
| 3,3'-dimethyl-4,4'-diaminodiphenylmethane (mole) | | | | | | | 0.05 | 0.1 |
| 3,3'-diaminodiphenyl sulfone (mole) | | 0.1 | | | | | | |
| 2,4-diaminotoluene (mole) | | | | | | 0.1 | 0.05 | |
| m-Cresol (g.) | 150 | | | | | | | |
| Xylenol (technical grade) (g.) | | 150 | 150 | 150 | 150 | 150 | 150 | 150 |
| Catalyst (percent based on resin) | | | (¹) | | | (²) | | |
| Reaction condition (temp.×time) | (³) | (⁴) | (³) | (⁴) | (⁵) | (⁵) | (³) | (⁴) |
| Yield (percent by weight) | 95.7 | 96.5 | 96.7 | 97.2 | 94.2 | 97.3 | 95.8 | 95.2 |
| Melting point (° C.) | >300 | >300 | >300 | >300 | >300 | >300 | >300 | >300 |
| Color | (⁷) | (⁷) | (⁷) | (⁷) | (⁷) | (⁷) | (⁷) | (⁷⁸) |
| Inherent viscosity | 0.72 | 0.84 | 0.75 | 0.80 | 0.65 | 0.81 | 0.91 | 0.7 |

¹ Tetrabutyl titanate (0.05).
² Quinoline (0.1).
³ 106° C.×1 hr.
⁴ 160° C.×2 hrs.
⁵ 170° C.×1 hr.
⁶ 140° C.×4 hrs.
⁷ Pale yellow.

EXAMPLE 11

Into the same apparatus as in Example 1 were simultaneously charged 191 g. (1.0 mole) of trimellitic anhydride, 134.5 g. (0.5 mole) of 3,3'-dichloro-4,4'-diaminodiphenylmethane, 99 g. (0.5 mole) of 4,4'-diaminodiphenylmethane and 1500 g. of technical grade xylenol, and the temperature of the resulting mixture was elevated from room temperature to 170° C. At this temperature, water began to be gradually evaporated off from the reaction system and the solution came to be transparent. The reaction was continued for about two hours and stopped after the effusion of water vapor from the system was over. To the resulting resin solution was added a small amount of petroleum naphtha to adjust the resin content to 20% by weight. The resulting solution was applied to a soft copper wire having a diameter of 1.0 mm. in a known manner and then baked at 400° C. at a drawing rate of 8.0 m./mm. to obtain a film having a thickness of 0.047 mm. on the wire. The thus obtained enameled wire had the characteristics shown in Table 2.

TABLE 2

Number of pin holes per 5 meters ___ 0.
Flexibiltiy (passed diameter for winding) _____ Same diameter.
Abrasion, repeating scrape under a load of 700 g. _____ 378 cycles.
Cut-through temperature _____ >300° C.
Heat shock (200° C. x 2 hrs.) _____ Same dia. good.
Breakdown voltage (normal): _____ 16.7 kv.
  (After immersion in water for 24 hrs.) _____ 16.4 kv.
  (After heating at 200° C. for 2 hrs.) _____ 16 kv.
Resistance to Flon 22 _____ Good.

Each of the above tests were made according to the following methods:

Abrasion, repeating scrape

A bead pin having a diameter of 0.4 mm. under a load of 700 g. were moved at a temperature of 10° to 30° C. forward and back in the direction of length on the coating on a magnet wire to determine the number of repeating scrape cycles required until the wire exposed.

Cut-through temperature

Two magnet wires were crossed, and a load of 700 g. was applied to the crossing point. The resulting assembly was placed in a constant temperature bath and the temperature of the bath was elevated while applying an alternating current of 100 v. to the wires to determine the temperature at which a short circuit between the wires was made.

Heat shock

A magnet wire was wound around round sticks having diameters integer times the diameter of the wire and maintained at a given temperature for a given time, after which the temperature was lowered to 10–30° C. to determine the smallest diameter of the stick at which no crack through which the conductor was observed with the naked eye was formed in the coating.

Resistance to Flon 22

A magnet wire was folded and heated at 120° C. for one hour, after which the thus treated wire was immersed for 24 hrs. in Flon 22 ($CHClF_2$) at a pressure of 80 kg./cm.² at 120° C. and then taken out. When the wire had no expansion like bubble or foam in the coating, it was estimated good.

A film was prepared from the resin solution obtained in the same manner as in Example 1 and subjected to infra-red spectrum analysis to find that the characteristic absorption due to imide appeared clearly and the characteristic absorption due to free carboxyl group disappeared, whereby it was confirmed that the product was completely imidated. The inherent viscosity of the product was 0.79.

EXAMPLES 12 TO 17

Polyamide-imide solutions were obtained by use of the starting materials and reaction conditions shown in Table 3 in the same manner as in Example 1 and then adjusted to a resin content of 20% by weight. The resulting solution was applied to a copper wire having a diameter of 10 mm. and then baked. The thus obtained enameled wire had the characteristics shown in Table 4. A film was prepared from this resin solution in the same manner as in Example 1 and subjected to infra-red spectrum analysis to find that the charatceristic absorption due to imide appeared clearly, whereby it was confirmed that the product was completely imidated.

TABLE 3

| Example | 12 | 13 | 14 | 15 | 16 | 17 |
|---|---|---|---|---|---|---|
| Trimellitic anhydrice (mole) | 1.0 | | | | 1.0 | 1.0 |
| Methyl trimellitate (1) (mol) | | 1.0 | | | | |
| Methyl trimellitate (2) (mol) | | | 1.0 | | | |
| Methyl trimellitate (3) (mole) | | | | 1.0 | | |
| 3,3'-dimethyl-4,4'diaminodiphenyl sulfone (mole) | | | | | 0.2 | |
| 3,3'-dimethoxy-4,4'-diaminodiphenyl ether (mole) | | 0.3 | | | | 0.6 |
| 3,3'-dicarboxy-4,4'diaminodiphenyl sulfide (mole) | | | 0.4 | | | |
| 3,3'-dihydroxy-4,4'-diaminodiphenylpropane (mole) | | | 0.1 | | | |
| 3,3'-dichloro-4,4'diaminodiphenylmethane (mole) | 0.7 | | | | | |
| 3,3'-diaminadiphenyl sulfone (mole) | | | | 0.1 | | |
| 3,3'-diaminodiphenylpropoane (mole) | | | | | 0.1 | |
| 3,3'-diaminodiphenylmethane (mole) | | | | 0.6 | | 0.3 |
| 3,3'-diaminodiphenyl ether (mole) | | | | | 0.5 | |
| 4,4'-diaminodiphenylmethane (mole) | | | | 0.5 | 0.2 | |
| 4,4'-diaminodipheny ether (mole) | 0.3 | | | | 0.2 | |
| Benzidine (mole) | | 0.7 | | | | |
| 1,5-diaminonaphthalene (mole) | | | | | 0.1 | 0.1 |
| Xylenol (technical grade) (g.) | 1,500 | 1,500 | 1,500 | 1,500 | 1,500 | 1,500 |
| Catalyst (percent based on resin) | | (¹) | (²) | (¹) | (¹) | |
| Reaction conditions (temp.×time) | (³) | (⁴) | (⁵) | (⁴) | (⁴) | (⁵) |

¹ Lead naphethenate (0.1).
² Lead napthenate (00.5).
³ 170° C.×2 hrs.
⁴ 160° C.×2 hrs.
⁵ 190° C.×1 hr.

TABLE 4

| Example | 12 | 13 | 14 | 15 | 16 | 1 |
|---|---|---|---|---|---|---|
| Characteristics of enameled wire: | | | | | | |
| Number of pin holes per 5 meters | 0 | 0 | 0 | 0 | 0 | 0 |
| Flexibility | Good | Good | Good | Good | Good | Good |
| Abrasion, repeating scrape (cycles) | 324 | 333 | 302 | 285 | 305 | 205 |
| Cut-through temp. (° C.) | >300 | >300 | >300 | >300 | >300 | >300 |
| Heat shock (200° C.×2 hrs.) | (¹) | (¹) | (¹) | (¹) | (¹) | (¹) |
| Break down voltage (KV): | | | | | | |
| Normal | 16.7 | 16.5 | 16.6 | 16.2 | 16.8 | 16.4 |
| After immersion in water for 24 hrs | 16.4 | 16.2 | 16.2 | 16.0 | 16.7 | 16.0 |
| After heating at 200° C. for 2 hours | 16.4 | 16.1 | 16.3 | 15.9 | 16.6 | 16.2 |
| Flon 22 resistance | Good | Good | Good | Good | Good | Good |
| Inherent viscosity of resin | 0.92 | 0.65 | 0.74 | 0.68 | 0.71 | 0.85 |

¹ Same diameter, good.

In Table 3, the methyl trimellitate was a mixture of mono-, di- and tri-esters, because the isolation of each ester was difficult. The theoretical acid values of trimellitic acid and methyl esters thereof are as follows:

| | Acid value | Degree of esterification |
|---|---|---|
| Trimellitic acid | 800.0 | 0 |
| Monomethyl trimellitate | 500.0 | ⅓ |
| Dimethyl trimellitate | 235.0 | ⅔ |
| Trimethyl trimellitate | 0 | 3/3 |

The methyl esters of trimellitic acid used in Examples 13 to 15 had the following acid values which were, respectively, approximate to the acid values of monoester, diester and triester:

Methyl trimellitate                   Acid value
   (1) _____ 495.2
   (2) _____ 242.5
   (3) _____ 1.2

EXAMPLES 18 TO 23

By use of the starting materials and reaction conditions shown in Table 5, polyamide-imide solutions were prepared in the same manner as in Example 1, and adjusted to a resin content of 20% by weight. The resulting solution was applied to a copper wire having a diameter of 1.0 mm. and baked in the same manner as in Example 1. The characteristics of the resulting enameled wire were as shown in Table 6. From said resin solution was prepared a film in the same manner as in Example 1 and subjected to infra-red spectrum analysis to find that the charatceristic absorption due to imide appeared clearly, whereby it was confirmed that the product was completely imidated.

in which X is at least one member selected from the group consisting of lower alkyl groups, lower alkoxy groups, halogens, —COOH, —OH and —$SO_3H$; Y is at least one member selected from the group consisting of —$CH_2$—, —O—, —S—, —$SO_2$— and

and Z is a lower alkyl group, and the remaining R is at

TABLE 5

| Example Number | 18 | 19 | 20 | 21 | 22 | 23 |
|---|---|---|---|---|---|---|
| Trimellitic anhydride (mole) | 1.0 | 1.0 | 1.0 | 1.0 | 1.0 | 1.0 |
| 3,3'-dimethyl-4,4'-diaminodiphenylmethane (mole) | 0.5 | | | | 0.8 | |
| 3,3'-dichloro-4,4'-diaminophenylmethane (mole) | | | 0.3 | | | 0.35 |
| 3,3'-diaminodiphenylsulfone (mole) | | 0.6 | | | | |
| 3,3'-diaminodiphenyl ether (mole) | | | | 0.4 | | |
| 2,4-diaminotoluene/2,6-diaminotoluene (80/20) (mole) | | | | 0.1 | | |
| 4,4'-diaminodiphenylsulfone (mole) | | 0.1 | | | | |
| 4,4'-diaminodiphenylmethane (mole) | 0.5 | | | | | |
| 4,4'-diaminodiphenyl ether (mole) | | 0.3 | | | | 0.65 |
| 4,4'-diaminodiphenylpropane (mole) | | | 0.7 | | | |
| Benzidine (mole) | | | | 0.4 | | |
| 1,5-diaminonaphthalene (mole) | | | | 0.1 | 0.2 | |
| Xylenol (technical grade) (g.) | 1,500 | 1,500 | 1,500 | 1,500 | 1,500 | 1,500 |
| Catalyst (percent based on resin) | (¹) | (²) | (³) | | (¹) | (¹) |
| Reaction conditions (Temp.×time) | (⁴) | (⁵) | (⁶) | (⁷) | (⁷) | (⁷) |

¹ Tetrabutyl titanate (0.1).
² γ-Picoline (0.1).
³ Lead naphthenate (0.1).
⁴ 160° C.×2 hrs.
⁵ 170° C.×1 hr.
⁶ 190° C.×1 hr.
⁷ 170° C.×2 hrs.

TABLE 6

| Example Number | 18 | 19 | 20 | 21 | 22 | 23 |
|---|---|---|---|---|---|---|
| Characteristic of enameled wire: | | | | | | |
| Number of pin holes per 5 meters | 0 | 0 | 0 | 0 | 0 | 0 |
| Flexibility | Good | Good | Good | Good | Good | Good |
| Abrasion, repeating scrape (cycles) | 312 | 335 | 290 | 310 | 298 | 362 |
| Cut-through temp. (° C.) | >300 | >300 | >300 | >300 | >300 | >300 |
| Heat shock (200° C.×2 hrs.) | (¹) | (¹) | (¹) | (¹) | (¹) | (¹) |
| Break down voltage (KV): | | | | | | |
| Normal | 16.2 | 16.4 | 16.5 | 16.2 | 16.4 | 16.4 |
| After immersion in water for 24 hrs | 16.2 | 16.4 | 16.5 | 16.2 | 16.4 | 16.4 |
| After heating at 200° C. for 2 hrs | 16.1 | 16.4 | 16.4 | 16.3 | 16.3 | 16.4 |
| Flon 22 resistance | Good | Good | Good | Good | Good | Good |
| Inherent viscosity of produced resin | 0.68 | 0.80 | 0.82 | 0.85 | 0.66 | 0.95 |

¹ Same diameter, good.

What we claim is:

1. An aromatic polyamide-imide soluble in phenolic solvent consisting essentially of the recurring unit represented by the formula:

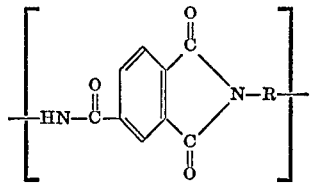

wherein R is a divalent radical having benzene unsaturation, the two bonds of which are attached to different carbon atoms of the benzene ring, at least 30 mole percent of R being at least one member selected from the group consisting of divalent radicals represented by the formulas:

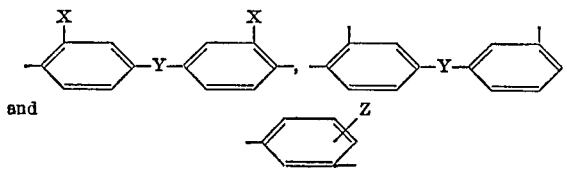

least one member selected from the group consisting of divalent radicals represented by the formulas:

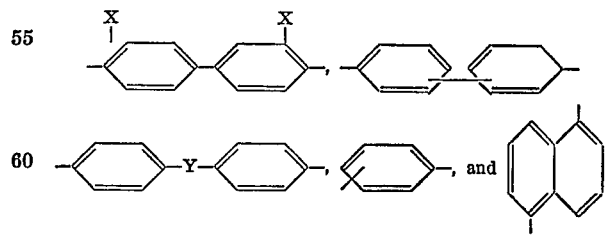

said polyamide-imide having an inherent viscosity of at least 0.1 as measured in m-cresol at a concentration of 0.5 g./100 ml. at 30° C.

2. An aromatic polyamide-imide according to claim 1, wherein all the R's are selected from the group consisting of divalent radicals represented by the formulas:

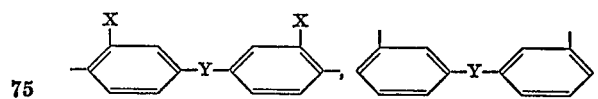

and

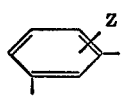

in which X, Y and Z are the same as defined above.

3. An aromatic polyamide-imide according to claim 1, wherein at least 30 mole percent of R is selected from the group consisting of divalent radicals represented by the formulas:

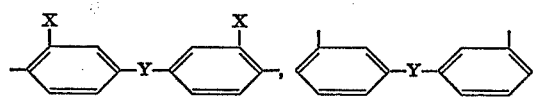

and

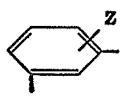

in which X, Y and Z are the same as defined above, and the remaining R is at least one member selected from the group consisting of divalent radicals represented by the formulas:

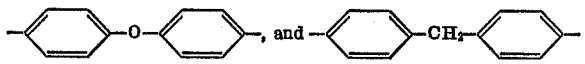

4. An aromatic polyamide-imide according to claim 2, wherein the recurring unit is represented by the formula:

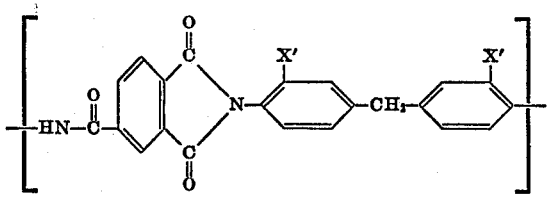

wherein X' is a lower alkyl group.

5. An aromatic polyamide-imide according to claim 2, wherein the recurring unit is represented by the formula:

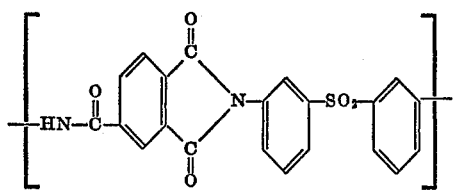

6. An aromatic polyamide-imide according to claim 2, wherein the recurring unit is represented by the formula:

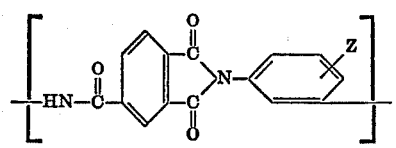

in which Z is a lower alkyl group.

7. A process for producing an aromatic polyamide-imide as defined in claim 1, which comprises heating, in at least one phenolic solvent selected from the group consisting of phenol, cresols, xylenols, halogenated phenols, halogenated cresols and halogenated xylenols, (a) at least one acid component selected from the group consisting of trimellitic acid, trimellitic anhydride, trimellitic anhydride monoacid halides and lower alkyl trimellitates, and (b) at least one aromatic diamine represented by the formula:

wherein R is a divalent radical having benzene unsaturation, the two bonds of which are attached to different carbon atoms in the benzene ring, at least 30 mole percent of said diamine being at least one member selected from the group consisting of diamines represented by the formulas:

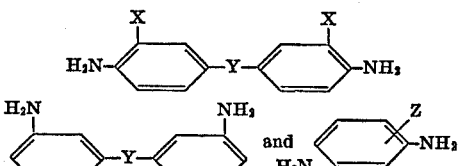

and the remaining mole percent of said diamine being at least one member selected from the group consisting of diamines represented by the formulas:

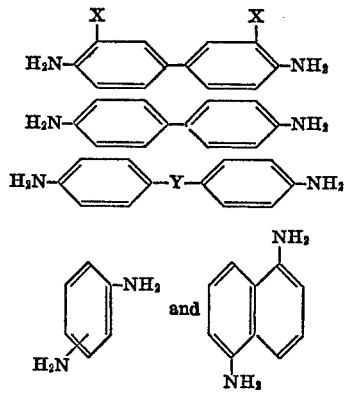

wherein X, Y and Z are the same as defined above, at a temperature higher than 80° C. but lower than the boiling point of the phenolic solvent until the imide cyclization is completed.

8. A process according to claim 7, wherein the molar ratio of the acid component to the aromatic diamine is 0.9 to 1.1:1.

9. A process according to claim 7, wherein the reactants are heated at a temperature of 100° to 240° C.

10. A process according to claim 7, wherein the reaction is effected in the presence of a catalyst.

11. A process according to claim 10, wherein the catalyst is a metal naphthenate, tetrabutyl titanate, γ-picoline, quinoline or tertiary amines.

12. A process according to claim 7, wherein the solvent is a mixture of the phenolic solvent and less than 30% by weight of a poor solvent selected from the group consisting of solvent naphtha, toluene and xylene.

13. A process according to claim 7, wherein the trimellitic anhydride monoacid halide is trimellitic anhydride monochloride.

14. A process according to claim 7, wherein the lower alkyl trimellitate is methyl trimellitate.

15. A process according to claim 7, wherein the aromatic diamine is 3,3'-dihydroxy-4,4'-diaminodiphenylmethane,
3,3'-dicarboxy-4,4'-diaminodiphenylmethane,
3,3'-diethoxy-4,4'-diaminodiphenyl sulfide,
3,3'-disulfo-4,4'-diaminodiphenylmethane,
3,3'-dimethyl-4,4'-diaminodiphenylmethane,
3,3'-diaminodiphenyl sulfone,
2,4-diaminotoluene,
3,3'-dichloro-4,4'-diaminodiphenylmethane,
4,4'-diaminodiphenylmethane,
3,3'-diaminodiphenylmethane,
3,3'-diaminodiphenylpropane,
3,3'-diaminodiphenyl ether,
4,4'-diaminodiphenyl ether, 4,4'-diaminodiphenyl sulfone or 4,4'-diaminodiphenylpropane.

References Cited

UNITED STATES PATENTS

| | | | |
|---|---|---|---|
| 3,260,691 | 7/1966 | Lavin et al. | 260—30.2 |
| 3,480,588 | 11/1969 | Lavin et al. | 260—47 |
| 3,494,890 | 2/1970 | Morello | 260—47 |

FOREIGN PATENTS

| | | | |
|---|---|---|---|
| 1,478,134 | 3/1967 | France | 260—78 T F |

WILLIAM H. SHORT, Primary Examiner

L. L. LEE, Assistant Examiner

U.S. Cl. X.R.

117—127, 128, 161 P; 260—33.4 P, 37 N, 47 CP, 65